United States Patent
Tan et al.

(10) Patent No.: US 11,340,978 B2
(45) Date of Patent: May 24, 2022

(54) METHODS, SYSTEMS AND APPARATUS FOR FUNCTIONAL SAFETY IMPLEMENTATION

(71) Applicant: Intel Corporation, Santa Clara, CA (US)

(72) Inventors: Tat Kin Tan, Bayan Lepas (MY); Kamarul Zaman Abdul Rashid, Bayan Lepas (MY)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/856,712

(22) Filed: Dec. 28, 2017

(65) Prior Publication Data

US 2019/0250969 A1     Aug. 15, 2019

(51) Int. Cl.
*G06F 11/00* (2006.01)
*G06F 11/07* (2006.01)

(52) U.S. Cl.
CPC ........ *G06F 11/079* (2013.01); *G06F 11/0736* (2013.01); *G06F 11/0751* (2013.01); *G06F 11/0772* (2013.01)

(58) Field of Classification Search
CPC ............. G06F 11/0721; G06F 11/0724; G06F 11/0736; G06F 11/0751; G06F 11/0772; G06F 11/079; G06F 11/22; G06F 11/2205; G06F 11/2236; G06F 11/2242; G06F 11/2268; G05B 23/0267; G05B 23/027; G05B 23/0272
See application file for complete search history.

(56) References Cited

U.S. PATENT DOCUMENTS

| | | | |
|---|---|---|---|
| 2005/0210327 A1* | 9/2005 | Allue | G06F 11/366 714/25 |
| 2007/0171029 A1* | 7/2007 | Inbarajan | G06Q 10/00 340/425.5 |
| 2013/0238933 A1* | 9/2013 | Shin | G06F 11/27 714/30 |
| 2014/0013157 A1* | 1/2014 | Hopkins | G06F 11/2205 714/30 |
| 2016/0146888 A1* | 5/2016 | Vooka | G06F 11/27 714/734 |
| 2016/0225198 A1* | 8/2016 | Punjabi | G07C 5/008 |
| 2017/0106986 A1 | 4/2017 | Sweeny et al. | |
| 2017/0142187 A1* | 5/2017 | Pimentel | H04L 67/06 |
| 2017/0355460 A1 | 12/2017 | Shannon et al. | |
| 2018/0086455 A1 | 3/2018 | Burch et al. | |
| 2018/0101458 A1* | 4/2018 | Kumar | G06F 9/4411 |
| 2018/0173220 A1 | 6/2018 | Wang et al. | |
| 2019/0047698 A1 | 2/2019 | Jassowski et al. | |

(Continued)

*Primary Examiner* — Michael Maskulinski

(74) *Attorney, Agent, or Firm* — Spectrum IP Law Group LLC

(57) ABSTRACT

The disclosure generally provides methods, systems and apparatus for functional safety systems. In one implementation, a shim layer of software codes that maps into register information collects diagnostic error data. The data is then channeled through one or more virtual tunnels into a Host-based STL. The virtual tunnels are unidirectional to only provide Read access and thereby prevent unauthorized Write access. In another embodiment, the information is provided to external subscribers. The external subscribers may gain access to different levels of data according to the subscription level.

21 Claims, 8 Drawing Sheets

(56) References Cited

U.S. PATENT DOCUMENTS

| | | |
|---|---|---|
| 2019/0050279 A1* | 2/2019 | Derr .................. G06F 11/079 |
| 2019/0068962 A1 | 2/2019 | Schoyck et al. |
| 2019/0166765 A1 | 6/2019 | Maor |
| 2019/0196512 A1 | 6/2019 | Blake et al. |
| 2019/0250969 A1 | 8/2019 | Tan et al. |
| 2020/0364456 A1 | 11/2020 | Tran et al. |

* cited by examiner

METHODS, SYSTEMS AND APPARATUS FOR FUNCTIONAL SAFETY IMPLEMENTATION

BACKGROUND

Functional Safety (Fu-Sa) is the part of the overall safety of a system or an equipment that depends on the system or equipment operating correctly in response to its inputs. Fu-Sa includes safe management of likely operator errors, hardware failures and environmental changes. The goal of Fu-Sa is to arrange products in a way that they are verifiably free of unacceptable risks. Typical Fu-Sa products are electronic systems which are used, for example, in vehicles, airplanes, hospitals or medical devices.

Self-test by software, also known as Software Test Library (STL), is a method for providing diagnostic coverage for safety-related integrated circuits (ICs). An STL is an SW program which is periodically executed in the field by a processing unit. One goal of the STL is to act as an information provider. To this end, it may act as a bridge of for diagnostic information. STLs are suitable for circuits that have limited or no hardware (HW) diagnostic measures and may also be used to complement safety mechanisms of integrated circuits that have HW support for safety.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
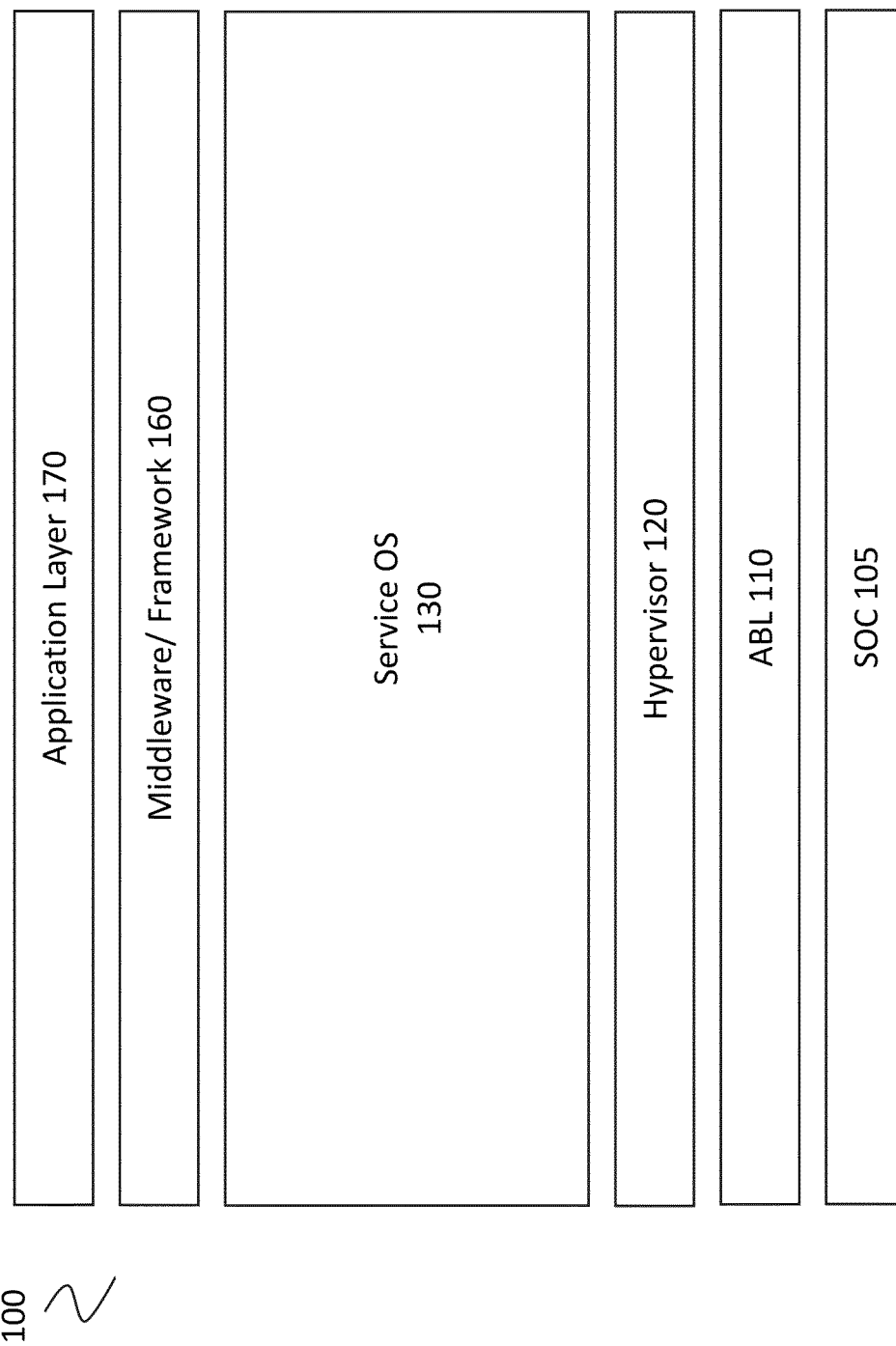
FIG. 1 is an exemplary software architecture according to one embodiment of the disclosure.

Conventional STLs include IP-based STL and Host-based STL of the Fu-Sa products. As used herein, Intellectual Property (IP) core is used interchangeably with core products or services offered by an SoC. Both STLs provide diagnostic test information locally in the system, platform or the SoC. The diagnostic test data is then presented to application layer of software that is running within the system or product. Conventional STLs do not allow the diagnostic test data to be externally harvested (e.g., presented to the cloud). For example, in a software defined cockpit product such as a car dashboard, an IP component may detect an error though its STL. The error is locally presented to the automotive dashboard to warn the user. Conventional STLs do not extend such STL data to external systems. In the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

In conventional applications, using the automotive sector's Fu-Sa STL solution, the safety concept determines that if an error is detected, the local warning system such as an audio chime is then triggered. If the error is correctable and none-severe, the driver may pull the car aside and reset or reboot the system to correct the error. For a more serious problem, the driver may have to send the car for service so that an in-house diagnostic test can determine the root cause. Conventional STLs do not allow live error harvesting. Instead, conventional STLs require timely diagnostic and troubleshooting which add to the cost of in-house testing at the service center. Similarly, if there is a hardware fault on a Fu-Sa-enabled machine, the failure data cannot be collected remotely or dynamically.

In certain embodiments, the disclosed embodiments provide systems, methods and apparatuses that allows diagnostic data of an underlying STL to be collected and externally communicated, for example, through the cloud or a fog system. In an exemplary embodiment, a software framework and service are disclosed that provide means to collect Fu-Sa STL diagnostic test data remotely. The collected data may be used for error analytic and response. Diagnostic data can be harvested, analyzed and live streamed through the disclosed software service. In still another embodiment, a System-on-Chip (SoC) is equipped with STL capable of harvesting relevant (or subscribed data) and externally communicating the harvested data.

In one implementation, a layer of software codes is mapped into one or more register to collect operational and/or diagnostic error details. The collected information is then channeled to a Host-based STL through one or more virtual tunnels. These virtual tunnels are single directional to only offer Read access to thereby prevent unauthorized Write access.

The disclosed embodiments, provide seamless data analytic capability for Fu-Sa STL. Thus, customers can detect or monitor hardware failures of SoC swiftly, enhancing time to market (TTM) and thereby providing faster service response.

In another embodiment, industrial factory with Fu-Sa enabled components can detect and troubleshoot hardware random failure promptly and reduce machinery downtime by providing faster resolutions. The disclosed embodiments apply equally in other technological endeavors, including, medical systems, avionics, transportations and drones.

FIG. 1 is an exemplary software architecture according to one embodiment of the disclosure. Specifically, Fig. shows software architecture for a Software Defined Cockpit (SDC), such as an automotive dashboard. SDC 100 may run on SoC 105 which supports various functionalities and services. SDC 100 is made up of several software layers that may provide the interface to the hardware SoC 105. It should be noted that while the following discussion relates to SoC, the disclosed principles are not limited to implementation on an SoC and may be applied to other onboard services, for example, integrated circuit, chipsets and other functions implemented on a chip or board.

The SoC 105 may support various hardware processing units including, Graphic User Interphase (GPU) 106, audio 108 or other IP core functionalities. Automotive Bootloader (ABL) 110 may be integrated into SoC 104 to access information and to provide in-vehicle compute module. ABL 110 may act as a BIOS that boot up the system. Hypervisor 122 may reside over SoC 105 to manage various virtual machines for software processing. Service Operating Software (OS) 130 may include various operating and service functionalities. This layer is further described below. Layer 160 may comprise the middleware and framework functionalities. Layer 160 may be used to enable software communication and management of data in distributed applications. Finally, application layer 170 may provide an interface between the lower layers and the user.

Figure 2:
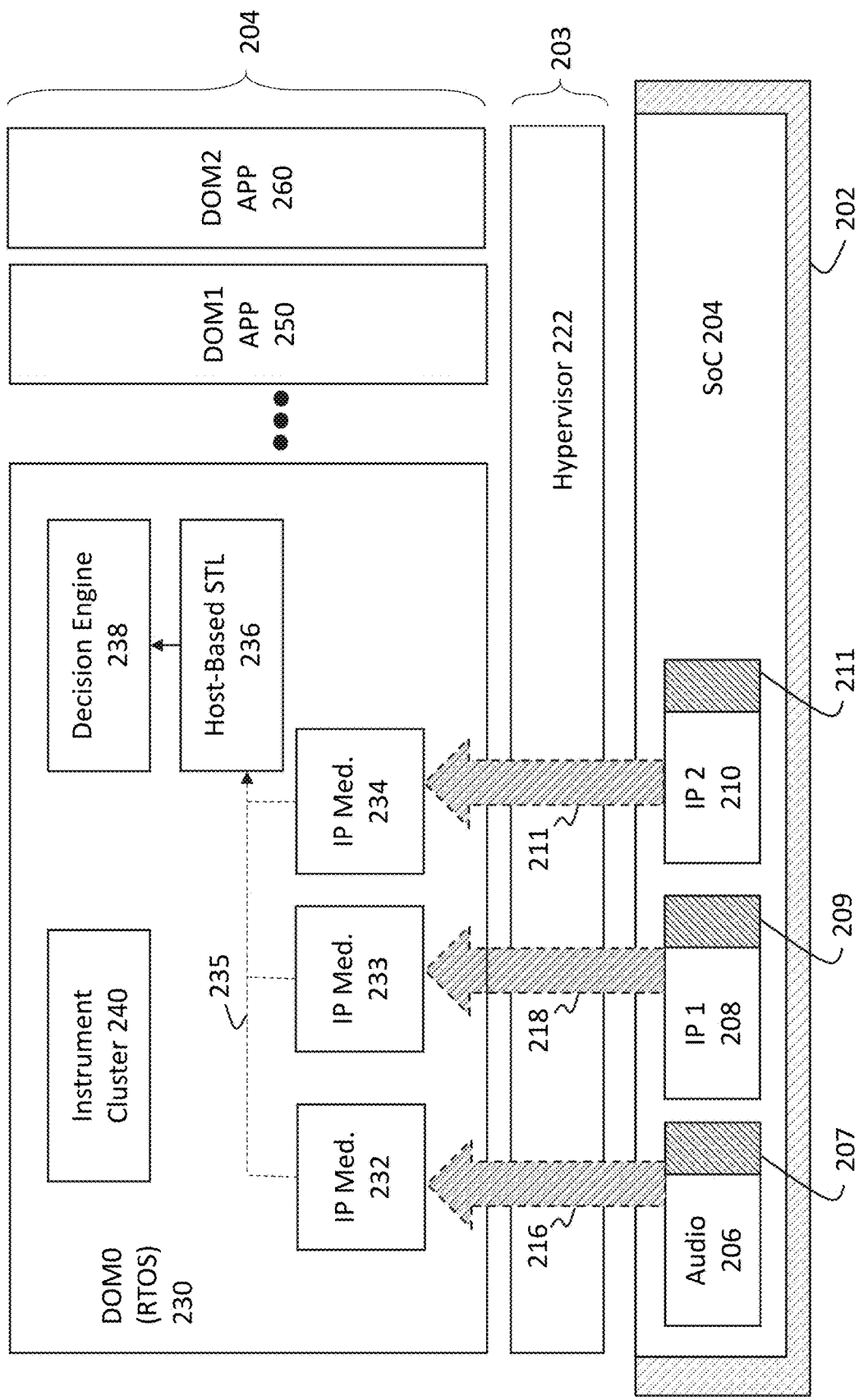
FIG. 2 illustrates an exemplary SoC software architecture according to one embodiment of the disclosure.

FIG. 2 illustrates an exemplary SoC software architecture according to one embodiment of the disclosure. Specifically, FIG. 2 shows platform 202 supporting SoC 204. SoC 204 may comprise hardware, software and firmware configured to serve any of a number of functions. SoC 204 provides many different functionalities. However, for illustrative purposes, in the exemplary embodiment of FIG. 2, SoC 204 is configured for automotive use. Specifically, SoC 204 of FIG. 2 is configured to control different entertainment functions of a vehicle. SoC 204 includes a number of processor circuitry and logic (not shown), as well as a number of memory circuitry and logic (not shown). By way of example, SoC 204 includes audio function (interchangeably, audio IP) 206 and other exemplary functionalities (interchangeably, IPs) including IP 1 and IP 2. Each of IP 1 and IP 2 may service a different function, for example, video entertainment, climate control, engine control, transmission control, breaking system, etc. Additionally, each IP may regularly (or continually) rub diagnostic test its respective functionality. For example, audio 206 may run diagnostic test on the audio system to identify and detect any failure or abnormality. While FIG. 2 shows only Audio 206, IP 1 208 and IP 2 210, the disclosed embodiments are not limited thereto and may include many other functionalities.

Each of the IP functions of FIG. 2 includes an IP-based STL (interchangeably, diagnostic processing capability). This is shown in the shaded area adjacent to each IP functionality. Specifically, the Audio functionality 206 includes diagnostic processing 207; IP 1 includes diagnostic processing 209 and IP 210 includes diagnostic processing 211. Diagnostic processing 207, 209 and 211 may include one or more processing circuitry, shift registers and operating logic to run diagnostic tests on IP functionality 206, 208 and 210, respectively. The diagnostic processing may store diagnostic information obtained from a corresponding IP functionality. In certain embodiments, a diagnostic processing circuitry may be configured for each IP functionality.

In certain exemplary embodiments, a layer of software codes that maps into register information is configured to collect diagnostic error details and channel the information into the Host-based STL. Such virtual tunnels may be single directional to only offer Read access and to prevent unauthorized Write access. The software code may be written into the registers of the IP-Based STL.

Hypervisor 222 may be hardware, software or a combination of hardware and software imposed over the SoC layer 204. Among others, hypervisor 222 may control information exchange between SoC 204 and software layers including Kernel space 203 and User space 204.

FIG. 2 shows three exemplary Domain (DOM) layers: DOM0, DOM1 and DOM 2. More DOM layers may be included without departing from the disclosed principles. Each Dom layer may comprise software configured for a different application. In the Exemplary embodiment of FIG. 2, DOM0 230 is configured to Real-Time Operating System (RTOS). In FIG. 2, DOM0 230 is shown in exploded view for illustrative purposes. DOM0 230 shows IP Mediators 232, 233 and 234. Each IP Mediator corresponds to an IP functionality. For example, IP Mediator 232 corresponds to Audio functionality 206, IP Mediator 233 corresponds to IP1 209 and IP Mediator 234 corresponds to IP2 210.

Instrument cluster 240 may comprise information display to the driver/operator (not shown). The instrument cluster may include one or more gauges or other informative means to communicate information, including, diagnostics to the driver/operator.

In certain embodiments, the disclosure provides a virtual tunneling mechanism that communicate diagnostic information from an IP functionality to a corresponding IP based mediator. The virtual tunneling may be implemented in software. Referring to FIG. 2, virtual tunnel 216 communicates information from Audio functionality 206 (and diagnostic processing circuitry 207) to IP Mediator 232. Virtual tunnel 218 communicates information from IP1 208 (and diagnostic processing circuitry 209) to IP Mediator 233. Virtual tunnel 211 communicates information from IP3 210 (and diagnostic processing circuitry 211) to IP Mediator 234. Each of virtual tunnels 216, 218 and 211 may define a one-way tunnel. A one-way tunnel prevents against hacking and unauthorizing access to SoC 204. This, information can be communicated from an IP functionality (i.e., 206/207, 208/209 and 210/211) to an IP Mediator (i.e., 232, 233, 234, respectively) in the so-called push manner. In FIG. 2, dotted line 235 connecting IP mediators 232, 233 and 234 to Host-Based STL 236 is part of the virtual tunnel. In certain embodiments, the IP mediator may comprise a software API. In such embodiments, the Host-based STL 236 may comprise a plug-in and the virtual tunnel may be covered up to the dotted line from IP Mediator to Host-based STL.

Each IP mediator relays information harvested from an IP functionality of SoC 204 to a Host-based STL. In FIG. 2, IP Mediators 232, 233 and 234 relay the information received from a respective virtual tunnel (216, 218 and 211) to Host-Based STL 236. The Host-based STL may receive, aggregate and transmit the diagnostics information. Host-based STL 236 may be implemented entirely in software.

In one embodiment, Host-based STL 236 may be considered as the central orchestration agent. All information may flow through the Host-based STL 236 and the STL (not IP-based STL) may be the only entity exposed externally. Host-based STL may be highly customizable depending on the application, needs, and the decision engine for which diagnostic data is filtered.

For example, the Host-based STL may be customized based on premiums paid by a subscriber such that premium service may provide the subscriber everything the subscriber requests. In contrast, basic services may be sold at lower subscription fee to provide a minimal data level. A vehicle manufacturer, for example, may determine the service level tear. In one embodiment, the Host-based STL may be distinguished from an IP-Based STL in that the Host based STL also collects other (e.g., miscellaneous) diagnostic information which do not come from IP (board, platform, vehicle electronic control unit (ECU)).

Decision Engine 238 receives the collected information from Host-based STL 236. Decision Engine 238 can be configured to determine which diagnostic information to communicate externally.

In one embodiment of the disclosure, a subscriber (e.g., driver or operator) may contract to receive operating and/or diagnostic information from the underlying system including SoC. For example, an operator can subscribe to receive all diagnostic information relating to the audio, graphics or camera functions of the vehicle. Once such subscription is in place, Decision Engine 238 may communicate the relevant diagnostic information to the subscriber. In this manner, the decision engine may act as filter which can be tuned based on the subscription level. The information may be communicated to the subscriber, for example, through instrument cluster 240. The information communication may additionally include audio visual warnings such as a chime or an error display.

Figure 3:
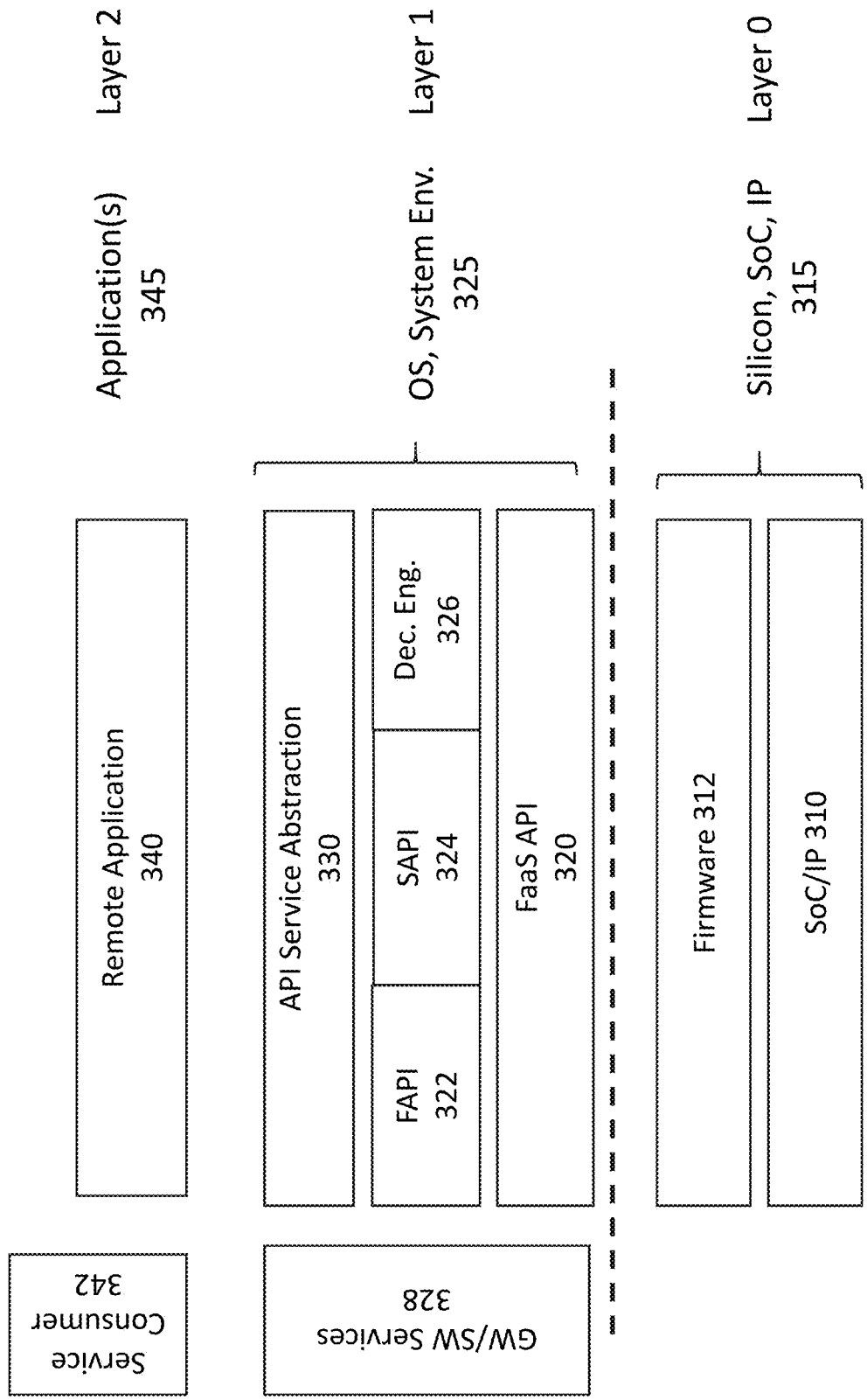
FIG. 3 illustrates an exemplary Fu-Sa Application Programing Interface (API) architecture according to one embodiment of the disclosure.

FIG. 3 illustrates an exemplary Fu-Sa Application Programing Interface (API) architecture according to one embodiment of the disclosure. The embodiment of FIG. 3 is generally a sever-oriented architecture. In FIG. 3, Fu-Sa as a Service (FaaS) API is configured to provide public access; that is, to provide external subscription to the information harvested through virtual tunneling. FaaS APIs may provide interfaces to external access points. For example, FaaS API may be linked with gateway (GW) services which then can be accessed via cloud, fog or other local area network (LAN) services. Developers and customers can also build third party consumer application or devices such as on-board diagnostic devices to access the FaaS interface.

In FIG. 3, Layer 0 refers to the hardware layer 315 which may comprise silicon, SoC and the IP functionalities. Layer 0 may include SoC/IP 310 and firmware 312. Layer 0 may harvest and report diagnostic information, including Fu-Sa information to the upper layers of the API.

Layer 1 defines the Operating System (OS) environment 325. This layer includes FaaS API 320, Functional API (FAPI) 322, System API (SAPI) 324 and Decision Engine 326. Decision Engine 326 may function substantially similar to Decision Engine 238 (FIG. 2). Decision Engine 326 may decide (filter) what operation and/or diagnostic information is externally published. The decision may be made as a function of the pending subscription. Thus, layer 1 may be considered a gateway to software services 328.

API Service Abstraction 330 refers to the amalgamation of the FAPI 322, SAPI 324 and DE 326 interfaces into a single level or layer of generalization to ease the implementation Layer 1 325 by Layer 2 345. API abstraction is used for illustrative purposes and to hide complex details of FAPI 322, SAPI 324 and Dec Engine 326. An abstraction layer is a conventional mechanism to hide the inner implementation detail of a particular set of functionalities or features, allowing separation of each concerns to facilitate interoperability and scalability and most of all to ease implementation.

Layer 2 may define end-user or end-consumer applications or solutions layer. For example, layer 2 may comprise the application(s) layer 342 and may include service consumer application(s). Service consumer applications (or applets) may be configured to communicate with the GW/SW services 328. This may include remote end-user or end-consumer application(s) 340 which may be accessed through the cloud.

Figure 4:
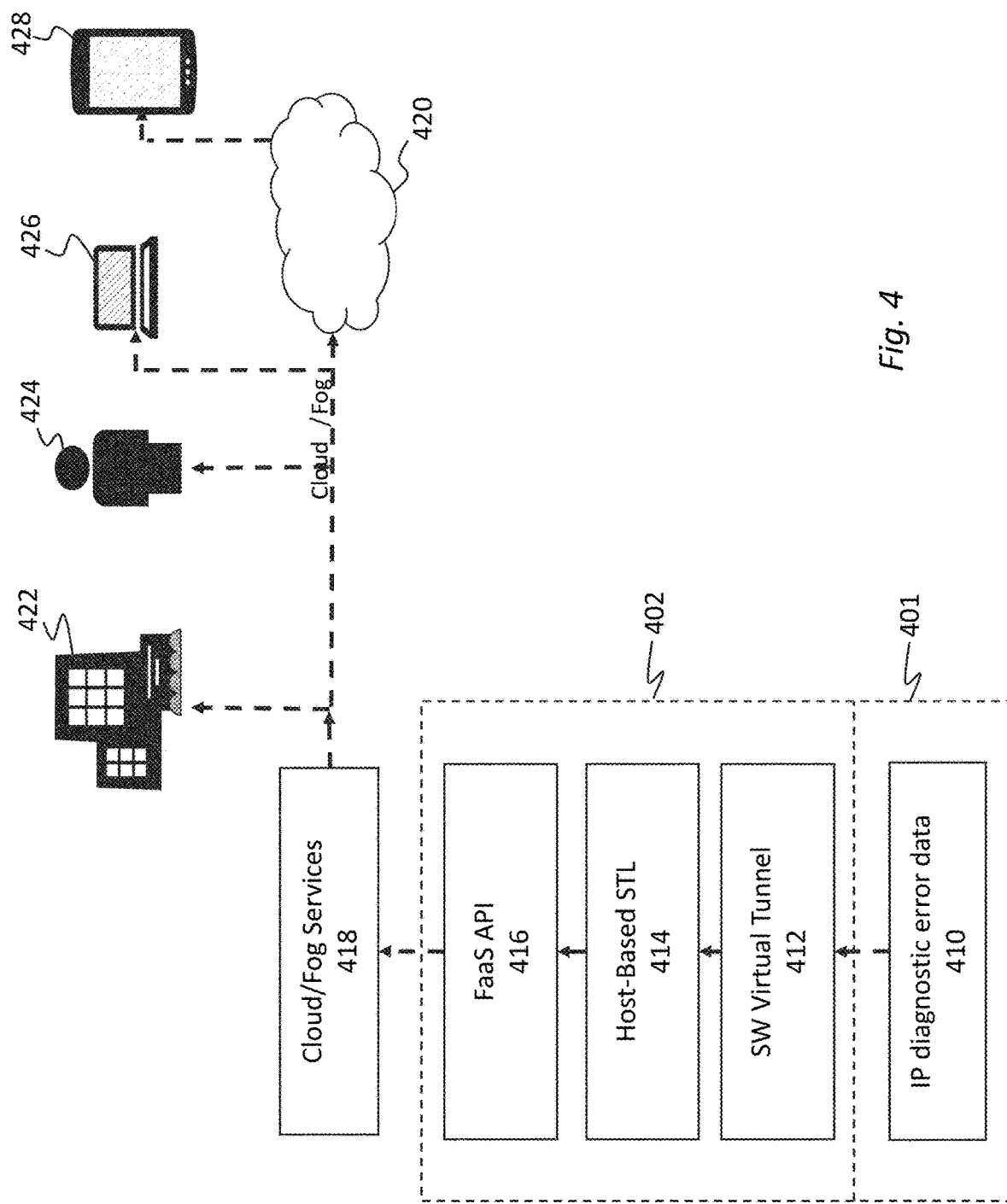
FIG. 4 schematically illustrates end-to-end implementation of a functional safety as a service according to one embodiment of the disclosure.

FIG. 4 schematically illustrates end-to-end implementation of a functional safety as a service according to one embodiment of the disclosure. In FIG. 4, layer 401 is the hardware abstraction. Layer 401 may also include SoC and the various IP functionalities as well as their corresponding IP-STL. Layer 401 generates AP diagnostic error data 410.

Layer 402 may be a software-based abstraction which comprises, software virtual tunnel 412, Host-Based STL 414 and FaaS API 416. Software virtual tunnel 412 may comprise a one-way tunnel from the hardware layer to communicate diagnostic (and/or operation) information from the SoC, and more particularly, from the IP-Based STL. Host-Based STL 414 receives diagnostic information as described in relation to the previous figures. The information is then directed to FaaS API 416, which in some embodiments, acts as a decision engine by filtering and relaying only information supported by the subscription.

Layer 418 illustrates cloud/fog gateway. Here, information received (filtered) by FaaS API 416 is transmitted to external sources. Layer 418 may include, among others, hardware, software and a combination of hardware and software configured to communicate certain filtered STL information to external sources. Layer 418 may include communication hardware which may implement one or more of IEEE communication standards.

For example, certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012, IEEE Standard for Information technology-Telecommunications and information exchange between systems Local and metropolitan area networks-Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12-TGac Channel Model Addendum Document"); IEEE 802.11 task group ad (TGad) (IEEE 802.11ad-2012, IEEE Standard for Information Technology and brought to market under the WiGig brand-Telecommunications and Information Exchange Between Systems-Local and Metropolitan Area Networks-Specific Requirements-Part 11: Wireless LAN Medium Access Control (MAC) and Physical Layer (PHY) Specifications-Amendment 3: Enhancements for Very High Throughput in the 60 GHz Band, 28 Dec., 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HDTM specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

Filtered SLT information may be communicated from GW 418 through cloud/fog 420 to external recipient. For example, information may be communicated to third-party monitoring agencies 422 (e.g., automotive manufacturing, dealership or repair shops). The information may also be transmitted to an individual subscriber 424, to computing device 426 configured to monitor and record the information or to subscriber's smartphone 428. In this regard, it should be noted that the communication is a one-way communication and each of 422, 424, 426 and 428 acts as a recipient without ability to affect the underlying SoC (not shown) which produces the diagnostic data.

Figure 5:
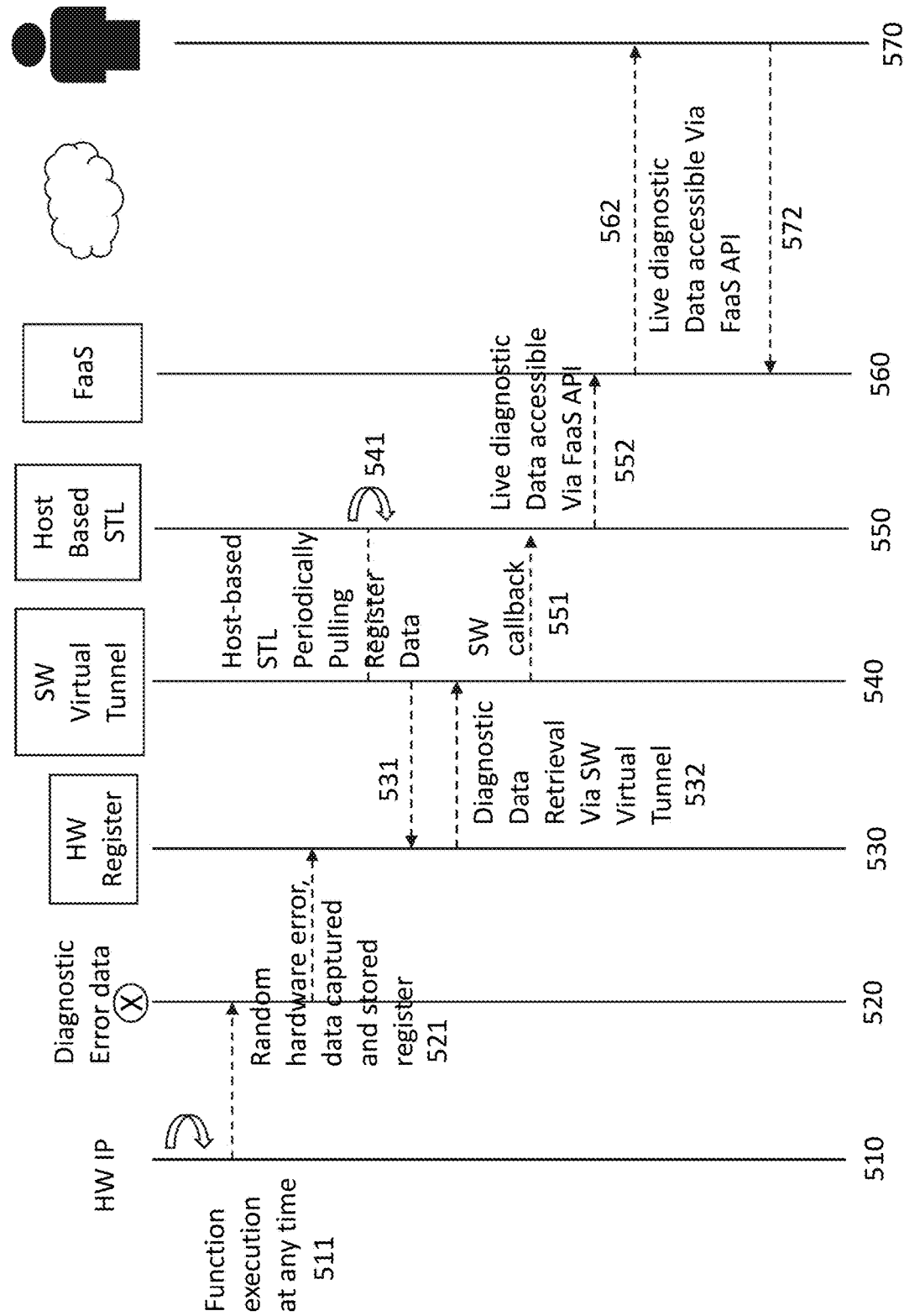
FIG. 5 schematically shows the diagnostic data flow according to one embodiment of the disclosure.

FIG. 5 schematically shows the diagnostic data flow according to one embodiment of the disclosure. At step 510, hardware IP (e.g., audio, video, GPS) operates as part of its routing and normal operation. Diagnostic data may be generated as result of normal operation of the SoC or function execution 511. At time 520 diagnostic error data may generate as result of the device's normal operation. The captured random hardware error data may be directed to hardware and stored at the hardware register (i.e., IP-based STL 207, FIG. 2).

A virtual tunnel (SW tunnel) may be established according to the disclosed embodiments at any time. In the exemplary embodiment of FIG. 5, a virtual tunnel is established between hardware register (IP-based STL) and the Host-based STL. This step is schematically illustrated as step 531 in FIG. 5. The establishment of the virtual tunnel may be initiated at the software layer as shown in FIG. 5. In another embodiment, the virtual tunnel may be initiate at the SoC.

At step 532, diagnostic data is retrieved from the HW registers and directed to the virtual (SW) tunnel as shown in steps 532. The host-based STL may periodically pole register data from the HW-based registers to pull diagnostic data, as shown in step 541. In response, at step 551, diagnostic data may be communicated to host-based data at step 551.

At step 552, live diagnostic data is provided to (or is made accessible) to the FaaS. The FaaS may retain the information and relay all or a portion (filtered) of the diagnostic information to subscriber 570 at step 562. Step 572 schematically illustrates an embodiment in which the subscriber inquires FaaS 560 for diagnostic data.

Figure 6:
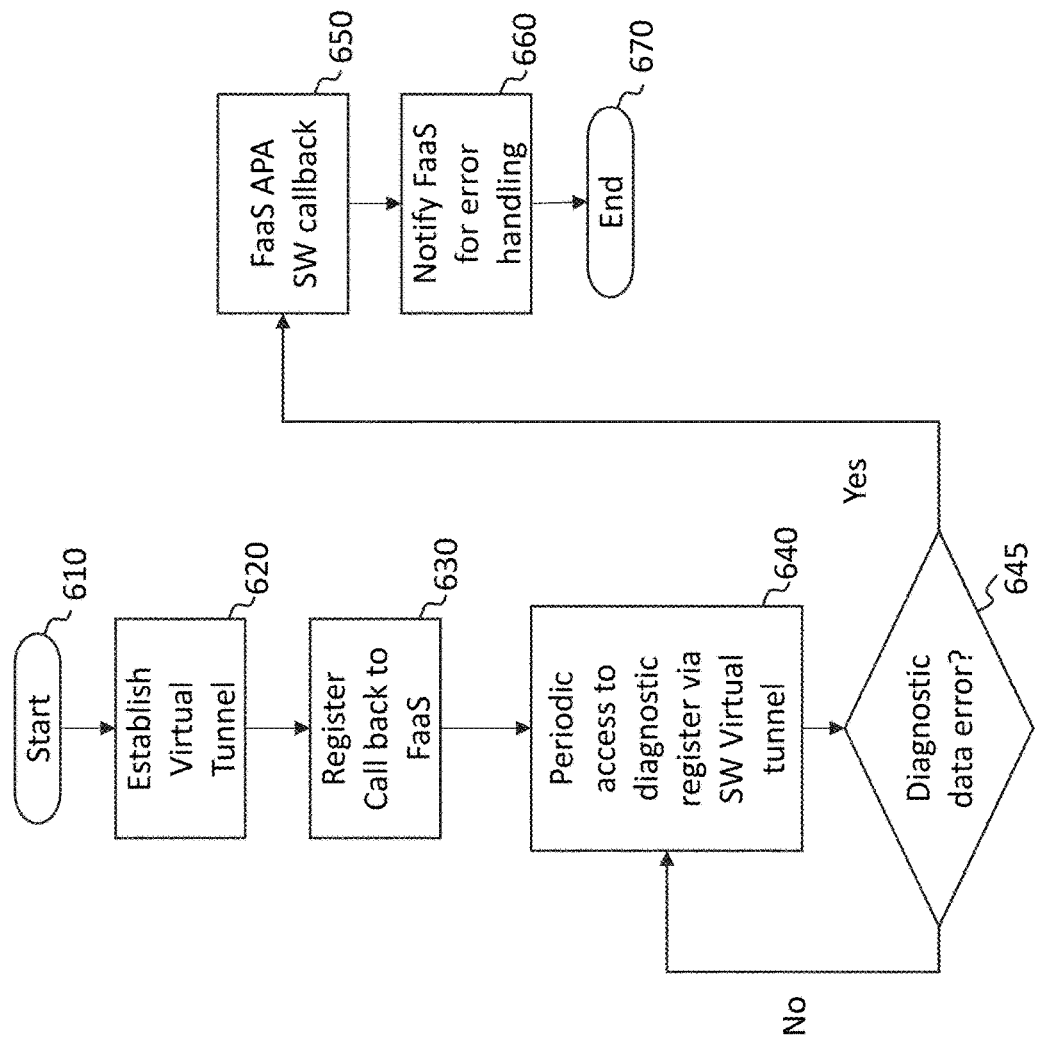
FIG. 6 is an exemplary timing diagram of the diagnostic data flow via a virtual software tunnel according to one embodiment of the disclosure.

FIG. 6 is an exemplary timing diagram of the diagnostic data flow via a virtual software tunnel according to one embodiment of the disclosure. Specifically, FIG. 6 shows the mechanism flow of the SW virtual tunneling and notification of FaaS callback. In the exemplary embodiment of FIG. 6, a software agent can be created in a Host-based STL and upon power on (or key-on in the SDC system), a virtual tunnel can be set up between the end-point to specific diagnostic registers. The specific diagnostic register may be associated with a specific SoC functionality. The registers may be mapped by the Software-defined Cockpit (SDC) system that contains error diagnostic data. A Host-based STL may periodically check on the register for diagnostic data or error. When the hardware error is detected, and error data is deposited into the register, the Host-based STL may receive the data via the SW virtual tunnel specially created for this purpose. The Host-based STL can trigger the FaaS SW callback which, in turns, can notify one or more applications on the arrival of diagnostic data. The FaaS system can be configured to provide live data via cloud or fog structure.

It should be noted that while the above description relates to a key-on (i.e., vehicle on) state, that the disclosed principles are not limited thereto. In certain embodiments, the Host-based STL can also retrieve error data stored in the key-off event. Some diagnostic tests due to the criticality, cannot be run when a car is moving. Thus, such tests must run when the vehicle is off and the result must be stored (i.e., Key-off). This is possible because the car is run on battery and even after the key is off, meaning system shut down, there is still a few seconds to run some key-off diagnostic tests. This information can be provided when a user enters the vehicle and before the engine ignition the STL is checks to see if key-off register contains any error information (e.g., information on the vehicle's lights, breaks or temperature control.)

The process of FIG. 6 starts at step 610. At step 620, a virtual tunnel can be established between a designated register (e.g., IP-based STL) and the FaaS layer. At step 630, the registers places a call back to the software layer. That is, the register contacts the software upon occurrence of a triggering event. In an exemplary embodiment, the triggering event can be loss of pressure at the vehicle's wheel. Once the pressure drops below a threshold, the associate register may signal the FaaS regarding the pressure drop. Step 640 shows the FaaS service periodically accessing the register via the virtual tunnel. At step 645, query is made as to whether new or additional diagnostic data error had been detected. If the answer is negative, the process returns to step

640. If new or additional diagnostic data error is detected, the process proceeds to step 650 where FaaS application is contacted. This step may include communicating information through a virtual software tunnel to FaaS.

At step 660, the FaaS is notified for error handling. The error handling may include notifying an external client via cloud or fog. In an exemplary embodiment, the step may include sending an email or other notification to the service provider or vendor. The error handling step may also include remedial measures to correct the error.

Figure 7:
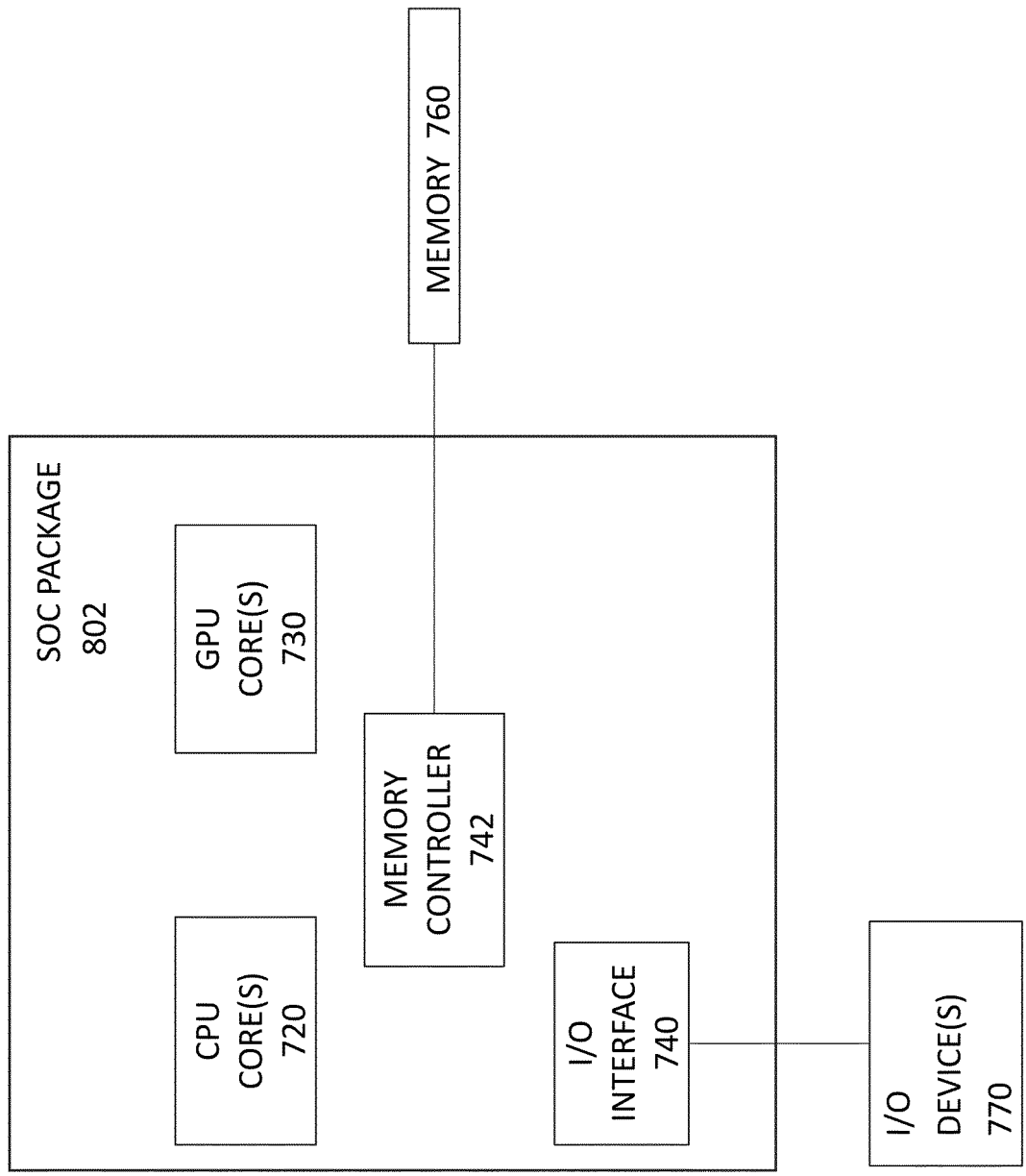
FIG. 7 illustrates a block diagram of an SOC package in accordance with an embodiment.
Figure 8:
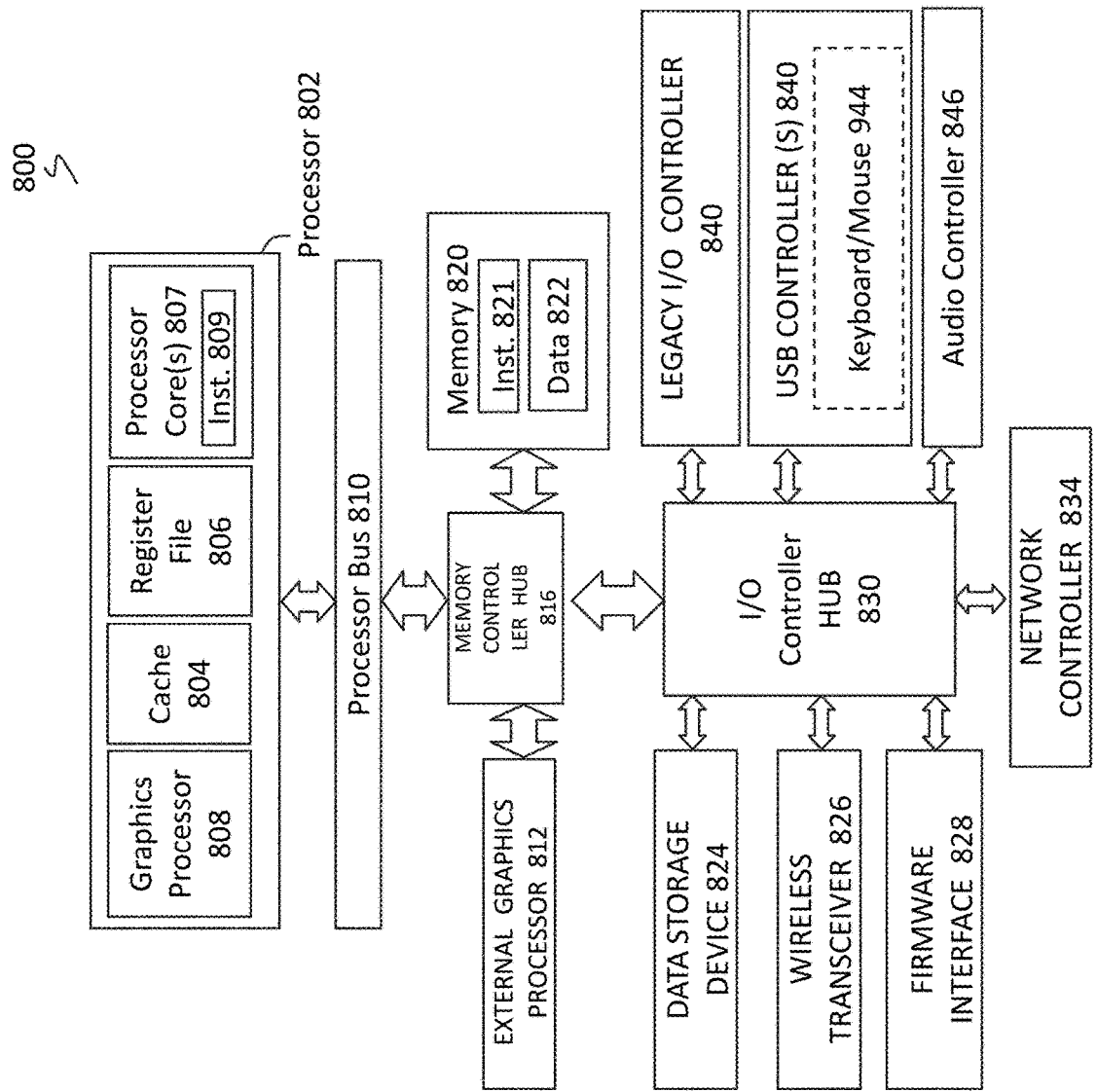
FIG. 8 is a block diagram of a processing system 800, according to an embodiment.

FIG. 7 illustrates a block diagram of an SOC package in accordance with an embodiment. As illustrated in FIG. 8, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

FIG. 8 is a block diagram of a processing system 800, according to an embodiment. In various embodiments the system 800 includes one or more processors 802 and one or more graphics processors 808, and may be a single processor desktop system, a multiprocessor workstation system, or a server system having a large number of processors 802 or processor cores 807. In on embodiment, the system 800 is a processing platform incorporated within a system-on-a-chip (SoC or SOC) integrated circuit for use in mobile, handheld, or embedded devices.

An embodiment of system 800 can include, or be incorporated within a server-based gaming platform, a game console, including a game and media console, a mobile gaming console, a handheld game console, or an online game console. In some embodiments system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 802 and a graphical interface generated by one or more graphics processors 808.

In some embodiments, the one or more processors 802 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 802 includes cache memory 804. Depending on the architecture, the processor 802 can have a single internal cache or multiple levels of internal cache. In some embodiments, the cache memory is shared among various components of the processor 802. In some embodiments, the processor 802 also uses an external cache (e.g., a Level-3 (L3) cache or Last Level Cache (LLC)) (not shown), which may be shared among processor cores 807 using known cache coherency techniques. A register file 806 is additionally included in processor 802 which may include different types of registers for storing different types of data (e.g., integer registers, floating point registers, status registers, and an instruction pointer register). Some registers may be general-purpose registers, while other registers may be specific to the design of the processor 802.

In some embodiments, processor 802 is coupled to a processor bus 810 to transmit communication signals such as address, data, or control signals between processor 802 and other components in system 800. In one embodiment the system 800 uses an exemplary 'hub' system architecture, including a memory controller hub 816 and an Input Output (I/O) controller hub 830. A memory controller hub 816 facilitates communication between a memory device and other components of system 800, while an I/O Controller Hub (ICH) 830 provides connections to I/O devices via a local I/O bus. In one embodiment, the logic of the memory controller hub 816 is integrated within the processor.

Memory device 820 can be a dynamic random-access memory (DRAM) device, a static random-access memory (SRAM) device, flash memory device, phase-change memory device, or some other memory device having suitable performance to serve as process memory. In one embodiment the memory device 820 can operate as system memory for the system 800, to store data 822 and instructions 821 for use when the one or more processors 802 executes an application or process. Memory controller hub 816 also couples with an optional external graphics processor 812, which may communicate with the one or more graphics processors 808 in processors 802 to perform graphics and media operations.

In some embodiments, ICH 830 enables peripherals to connect to memory device 820 and processor 802 via a high-speed I/O bus. The I/O peripherals include, but are not limited to, an audio controller 846, a firmware interface 828, a wireless transceiver 826 (e.g. Wi-Fi, Bluetooth), a data storage device 824 (e.g., hard disk drive, flash memory, etc.), and a legacy I/O controller 840 for coupling legacy (e.g., Personal System 2 (PS/2)) devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810. It will be appreciated that the system 800 shown is exemplary and not limiting, as other types of data processing systems that are differently configured may also be used For example, the I/O controller hub 830 may be integrated within the one or more processor 802, or the memory controller hub 816 and I/O controller hub 830 may be integrated into a discreet external graphics processor, such as the external graphics processor 812.

Additional Notes & Examples

Example 1 relates to an apparatus to collect and provide diagnostic information from a System-on-Chip (SoC), comprising: a plurality of first processors and a plurality of first registers, the plurality of first registers configured to receive a first service information defining a function performed by the plurality of first processors; a software test library (STL) to receive the first service information from the plurality of first registers; and a decision engine to receive the first service information from the STL and publish a select portion of the first service information; wherein the decision engine publishes the select portion of the received information as a function of a user subscription.

Example 2 relates to the apparatus of example 1, wherein the first service defines a first SoC function.

Example 3 relates to the apparatus of any preceding example, wherein at least a plurality of the first registers are configured to store the first service information.

Example 4 relates to the apparatus of any preceding example, wherein the STL exclusively receives the first service information through a first virtual tunnel.

Example 5 relates to the apparatus of any preceding example, wherein the decision engine publishes a select portion of the first service information.

Example 6 relates to the apparatus of any preceding example, wherein the decision engine comprises a gateway to an external access point.

Example 7 relates to the apparatus of any preceding example, further comprising a first application interface (mediator) to receive the first service information from the plurality of first registers and to relay the first service information to the STL.

Example 8 relates to the apparatus of any preceding example, further comprising a plurality of second processors and a plurality of second registers to perform a second SoC function, the plurality of second registers configured to receive a second service information Example 9 relates to the apparatus of any preceding example, wherein the STL, is configured to receive the second service information from the plurality of second registers through a second virtual tunnel.

Example 10 relates to at least one machine-readable medium comprising instructions that, when executed by computing hardware, including a processor coupled to a data store and to a plurality of data capture devices, cause the computing hardware to cause a System-on-Chip (SoC) to: store, at a plurality of shift registers, a first service information, the first service information defining a function performed by the plurality of first processors of the SoC; receive, at a STL, the first service information from the plurality of first shift registers; and select a portion of the first service information received from the STL at a decision engine and publish the selected portion of the first service information; wherein the decision engine publishes the select portion of the received information as a function of a user subscription.

Example 11 relates to the machine-readable medium of example 10, wherein the instructions are implemented at the SOC.

Example 12 relates to the machine-readable medium of any of examples 10-11, wherein the first service defines a first SoC function.

Example 13 relates to the machine-readable medium of any of examples 10-12, wherein at least a plurality of the first registers are configured to store the first service information.

Example 14 relates to the machine-readable medium of any of examples 10-13, wherein the instructions further cause the STL, to exclusively receive the first service information through a first virtual tunnel.

Example 15 relates to the machine-readable medium of any of examples 10-14, wherein the decision engine publishes a select portion of the first service information.

Example 16 relates to the machine-readable medium of any of examples 10-15, wherein the decision engine comprises a gateway to an external access point.

Example 17 relates to the machine-readable medium of example 10, wherein the instructions further cause a first application interface (mediator) to receive the first service information from the plurality of first registers and to relay the first service information to the STL.

Example 18 relates to the machine-readable medium of any of examples 10-17, wherein the instructions further cause a plurality of second processors and a plurality of second registers to perform a second SoC function, the plurality of second registers configured to receive a second service information.

Example 19 relates to the machine-readable medium of any of examples 10-18, wherein the STL is configured to receive the second service information from the plurality of second registers through a second virtual tunnel.

Example 20 relates to a system to collect and provide diagnostic information received from an integrated circuit (IC), comprising: a plurality of first processors and a plurality of first registers, the plurality of first registers configured to receive a first service information defining a function performed by the plurality of first processors; a software test library (STL) to receive the first service information from the plurality of first registers; and a decision engine to receive the first service information from the STL and publish a select portion of the first service information; wherein the decision engine publishes the select portion of the received information as a function of a user subscription.

Example 21 relates to the system of example 20, wherein the first service defines a first IC function and wherein at least a plurality of the first registers are configured to store the first service information.

Example 22 relates to the system of any of examples 20-21, wherein the STL exclusively receives the first service information through a first virtual tunnel and wherein the decision engine publishes a select portion of the first service information.

Example 23 relates to the system of any of examples 20-22, wherein the decision engine comprises a gateway to an external access point.

Example 24 relates to the system of any of examples 20-23, further comprising a first application interface (mediator) to receive the first service information from the plurality of first registers and to relay the first service information to the STL.

Example 25 relates to the system of any of examples 20-24, further comprising a plurality of second processors and a plurality of second registers to perform a second IC function, the plurality of second registers configured to receive a second service information and wherein the STL is configured to receive the second service information from the plurality of second registers through a second virtual tunnel.

Example 26 relates to a System-on-Chip (SoC), comprising: means for storing, at a plurality of shift registers, a first service information, the first service information defining a function performed by the plurality of first processors of the SoC; means for receiving, at a STL, the first service information from the plurality of first shift registers; and means for selecting a portion of the first service information received from the STL at a decision engine and publish the selected portion of the first service information; wherein the decision engine is configured to publish the select portion of the received information as a function of a user subscription.

Example 27 relates to the system of example 26, wherein the instructions are implemented at the SOC.

Example 28 relates to the system of example 26 or 27, wherein the first service defines a first SoC function.

Example 29 relates to the system of any of examples 26-28, wherein at least a plurality of the first registers are configured to store the first service information.

Example 30 relates to the system of any of examples 26-29, wherein the instructions further cause the STL to exclusively receive the first service information through a first virtual tunnel.

Example 31 relates to the system of any of examples 26-30, wherein the decision engine publishes a select portion of the first service information.

Example 32 relates to the system of any of examples 26-31, wherein the decision engine comprises a gateway to an external access point.

Example 33 relates to the system of any of examples 26-32, wherein the instructions further cause a first application interface (mediator) to receive the first service information from the plurality of first registers and to relay the first service information to the STL.

Example 34 relates to the system of any of examples 26-33, wherein the instructions further cause a plurality of second processors and a plurality of second registers to perform a second SoC function, the plurality of second registers configured to receive a second service information.

Example 35 relates to the system of any of examples 26-34, wherein the STL is configured to receive the second service information from the plurality of second registers through a second virtual tunnel.

Example 36 relates to a machine readable medium including code, when executed, to cause a machine to perform the method of any one of examples 26-35.

While the principles of the disclosure have been illustrated in relation to the exemplary embodiments shown herein, the principles of the disclosure are not limited thereto and include any modification, variation or permutation thereof.

What is claimed is:

1. An apparatus to collect and provide diagnostic information from a System-on-Chip (SoC), comprising:
    a plurality of first processors and a plurality of first registers, the plurality of first registers configured to receive a first service information defining a function performed by the respective plurality of first processors;
    a software test library (STL) to receive the first service information from the plurality of first registers; and
    a decision engine to receive the first service information from the STL and publish a select portion of the first service information;
    wherein the decision engine publishes the select portion of the received information as a function of a user subscription; and
    wherein the STL exclusively receives the first service information through a first virtual tunnel and wherein the first virtual tunnel comprises a single directional communication path to prevent unauthorized Write access.

2. The apparatus of claim 1, wherein the first service defines a first SoC function.

3. The apparatus of claim 1, wherein at least a plurality of the first registers are configured to store the first service information.

4. The apparatus of claim 1, wherein the decision engine comprises a gateway to an external access point.

5. The apparatus of claim 1, further comprising a first application interface (mediator) to receive the first service information from the plurality of first registers and to relay the first service information to the STL.

6. The apparatus of claim 1, further comprising a plurality of second processors and a plurality of second registers to perform a second SoC function, the plurality of second registers configured to receive a second service information.

7. The apparatus of claim 6, wherein the STL is configured to receive the second service information from the plurality of second registers through a second virtual tunnel.

8. At least one machine-readable medium comprising instructions that, when executed by computing hardware, including a processor coupled to a data store and to a plurality of data capture devices, cause the computing hardware to cause a System-on-Chip (SoC) to:
    store, at a plurality of first shift registers, a first service information, the first service information defining a function performed by a plurality of first processors of the SoC;
    receive, at a STL, the first service information from the plurality of first shift registers; and select a portion of the first service information received from the STL at a decision engine and publish the selected portion of the first service information;
    wherein the STL exclusively receives the first service information through a first virtual tunnel; and
    wherein the decision engine publishes the select portion of the received information as a function of a user subscription and wherein the first virtual tunnel comprises a single directional communication path to prevent unauthorized Write access.

9. The machine-readable medium of claim 8, wherein the instructions are implemented at the SOC.

10. The machine-readable medium of claim 9, wherein the first service information defines a first SoC function.

11. The machine-readable medium of claim 10, wherein at least a plurality of the first shift registers are configured to store the first service information.

12. The machine-readable medium of claim 8, wherein the decision engine comprises a gateway to an external access point.

13. The machine-readable medium of claim 8, wherein the instructions further cause a first application interface (mediator) to receive the first service information from the plurality of first shift registers and to relay the first service information to the STL.

14. The machine-readable medium of claim 8, wherein the instructions further cause a plurality of second processors and a plurality of second shift registers to perform a second SoC function, the plurality of second shift registers configured to receive a second service information.

15. The machine-readable medium of claim 14, wherein the STL is configured to receive the second service information from the plurality of second shift registers through a second virtual tunnel.

16. A system to collect and provide diagnostic information received from an integrated circuit (IC), comprising:
- a plurality of first processors and a plurality of first registers, the plurality of first registers configured to receive a first service information defining a function performed by the plurality of first processors;
- a software test library (STL) to receive the first service information from the plurality of first registers; and
- a decision engine to receive the first service information from the STL and publish a select portion of the first service information;
- wherein the decision engine publishes the select portion of the received information as a function of a user subscription; and
- wherein the STL exclusively receives the first service information through a first virtual tunnel and wherein the first virtual tunnel comprises a single directional communication path to prevent unauthorized Write access.

17. The system of claim 16, wherein the first service defines a first IC function and wherein at least a plurality of the first registers are configured to store the first service information.

18. The system of claim 16, wherein the decision engine publishes a select portion of the first service information.

19. The system of claim 16, wherein the decision engine comprises a gateway to an external access point.

20. The system of claim 16, further comprising a first application interface (mediator) to receive the first service information from the plurality of first registers and to relay the first service information to the STL.

21. The system of claim 16, further comprising a plurality of second processors and a plurality of second registers to perform a second IC function, the plurality of second registers configured to receive a second service information and wherein the STL is configured to receive the second service information from the plurality of second registers through a second virtual tunnel.

* * * * *